March 28, 1961 J. H. STRAW 2,976,772
MACHINE TOOL
Filed Dec. 19, 1955 4 Sheets-Sheet 1
Fig. 1
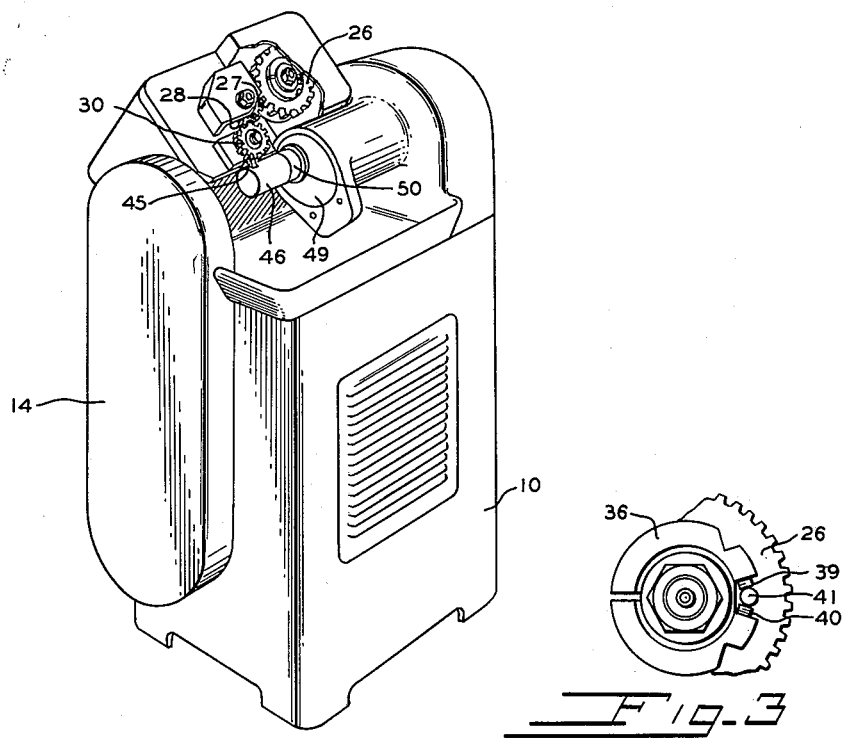
Fig. 3
Fig. 2 Fig. 4 Fig. 5
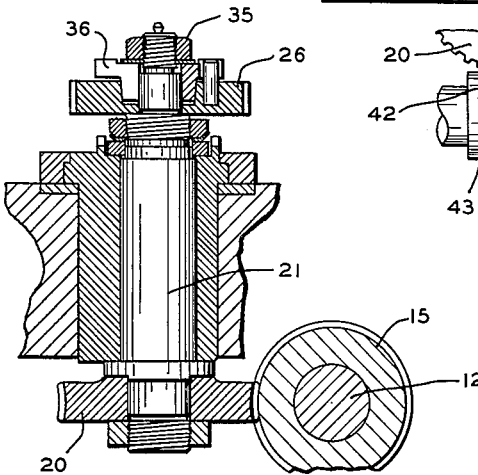
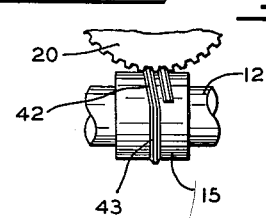
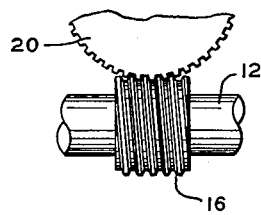
INVENTOR.
Jesse H Straw
BY Edward J. Noij
atty.

March 28, 1961 J. H. STRAW 2,976,772
MACHINE TOOL

Filed Dec. 19, 1955 4 Sheets-Sheet 2

INVENTOR.
Jesse H. Straw
BY Edward F. Wolf
atty.

March 28, 1961 J. H. STRAW 2,976,772
MACHINE TOOL
Filed Dec. 19, 1955 4 Sheets-Sheet 3
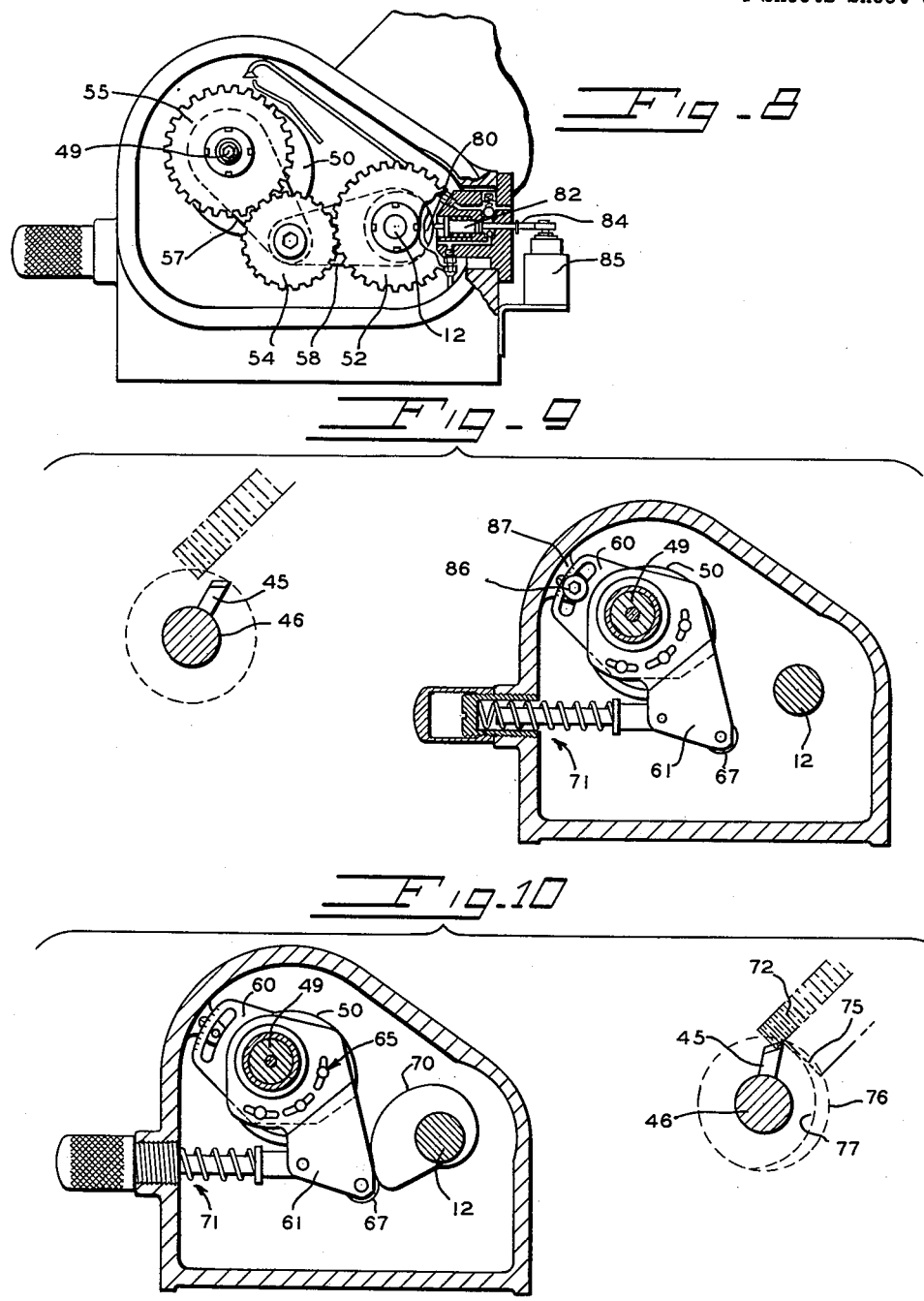

March 28, 1961 J. H. STRAW 2,976,772
MACHINE TOOL
Filed Dec. 19, 1955 4 Sheets-Sheet 4
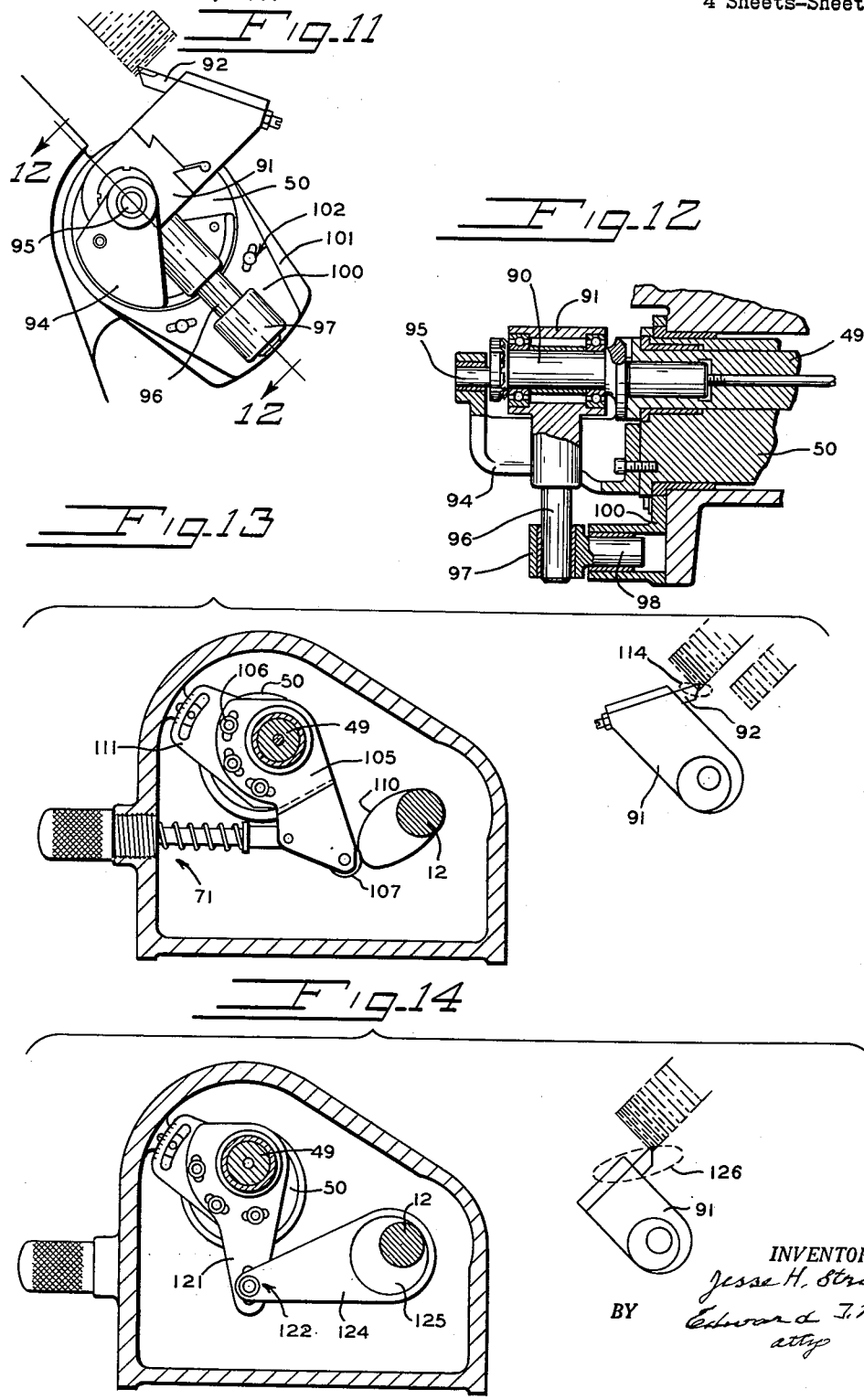
INVENTOR.
Jesse H. Straw
BY Edward T. Noix
attys United States Patent Office 2,976,772
Patented Mar. 28, 1961

2,976,772

MACHINE TOOL

Jesse H. Straw, Brookville, Ohio, assignor, by mesne assignments, to The Sheffield Corporation, a corporation of Delaware Filed Dec. 19, 1955, Ser. No. 553,961

12 Claims. (Cl. 90—1.4)

This invention relates to machine tools and more particularly to chamfering or burring machines.

It is an object of this invention to provide a chamfering apparatus adapted for high rates of operation through a mechanism which is simple in construction and operation and having drive characteristic insuring a long service life.

It is a further object to provide an apparatus for chamfering toothed parts such as gears or the like, adaptable with minor modification and adjustment to provide a number of different cutter movements and cutter to work timing relationships, whereby a single machine can be employed in a variety of different applications for different chamfering requirements.

It is a further object to provide a chamfering apparatus wherein the cutter may operate in a symmetrical path, or wherein the path of the cutter can be simply modified as necessary in regions of possible work interference to chamfer those edges desired and clear adjacent portions of the work.

It is a further object to provide a method for chamfering wherein the axis of rotation of a cutter moving in timed relation to a toothed part is cyclically shifted once during each cutter rotation and each tooth advance to direct the cutter properly for rapid chamfering in a tooth space and to clear interfering portions of the work.

It is a further object to provide a chamfering apparatus wherein a cutter shaft is mounted eccentrically in a sleeve oscillated in timed relationship to shaft rotation.

Figure 6:
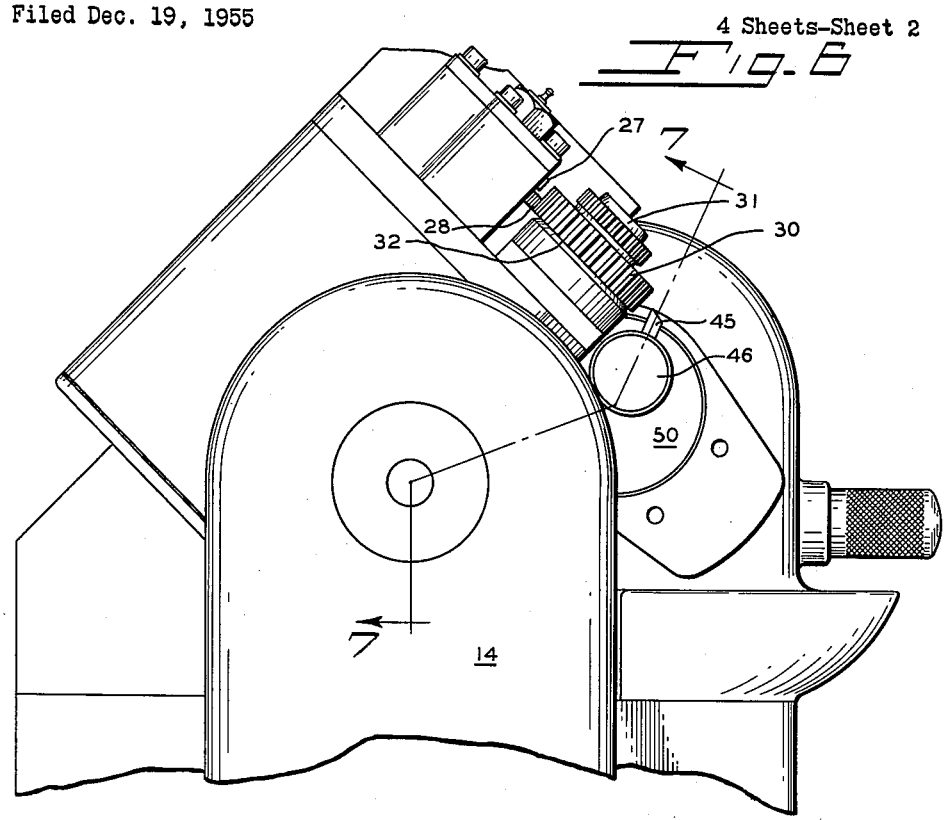
Figure 7:
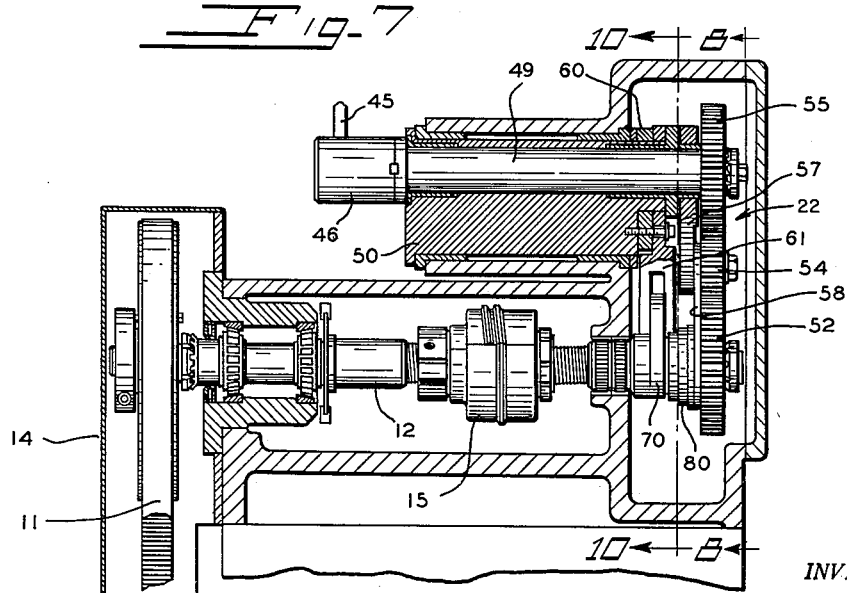

Other objects and advantages of the invention will be apparent from the following description, the appended claims, and the accompanying drawings, in which, Figure 1 is a perspective view of an apparatus embodying the present invention, Figure 2 is a sectional view taken along the axis of the work drive shaft, Figure 3 is an end view of the work drive gear and its drive connection, Figures 4 and 5 are detail fragments illustrating respectively an intermittent work drive and a continuous drive, Figure 6 is an enlarged view of the upper, left-hand side of the apparatus of Figure 1, Figure 7 is a sectional view on line 7—7 of Figure 6, Figure 8 illustrates a portion of the drive for the cutter movement, taken on line 8—8 of Figure 7 with the housing cover removed, Figures 9 and 10 illustrate another portion of the cutter drive in the plane of line 10—10 of Figure 7 with the parts arranged for a circular cutter path in Figure 9 and a predetermined departure from a circular path in Figure 10, Figures 11 to 13 illustrate the cutter drive giving a noncircular cutter movement with the cutter continuously directed toward the work, Figure 11 showing an adaptor, Figure 12 being a section on line 12—12 of Figure 11 and Figure 13 illustrating the sleeve drive and an exemplary cutter path, and Figure 14 shows a portion of a cutter drive.

The apparatus of the present invention is provided for forming toothed parts and more specifically has application to the chamfering or deburring of the end faces of gears, splines or other parts to be formed.

Through the teaching of this invention a number of materially different cutter strokes can be easily obtained for different chamfering operations. This makes possible the provision of a more universal machine and the more economical manufacture of single purpose machines for different applications. Through the present invention unique cutter movements can be obtained which have material advantages in speed and accuracy of chamfering in a machine which is more economical in construction and useful for a long service life.

In the illustrated modifications of this invention the work gear is meshed with a rotating pilot gear driven in timed relationship, either intermittently or continuously, with the cutter movement. A cutter holder supported at the outer end of a rotating shaft is moveable transverse its axis preferably by being mounted eccentrically in a rockable sleeve. The cutter is moved in response to these superimposed drives to engage and chamfer end faces of toothed parts as it passes between the teeth.

When the sleeve supporting the shaft is held stationary and the shaft is rotated circular cutter movement is obtained. By driving the shaft and simultaneously rocking the sleeve a rotating cutter can be employed with its center of rotation shifted during each rotation to modify the normally circular cutter path to avoid interference with surfaces of the work part adjacent the faces being chamfered and obtain the desired movement during cutting.

Through a simple modification wherein the shaft has an eccentric at its outer end and a cutter holder supported on the eccentric includes means guiding it for rocking about and radial movement relative to a fixed center, a non-rotating cutter movement in a substantially elliptical path can be obtained. By concurrently rocking the shaft supporting sleeve this path can also be modified for applications as desired.

In each of the modifications illustrated the rotation of the cutter supporting shaft would give either a normally circular rotation or a substantially elliptical non-rotating movement to the cutter in substantially symmetrical, non-retracing paths. The oscillation of the shaft supporting sleeve allows modification of these paths for particular applications as desired.

The work drive is similar for each of the modifications illustrated and in this application advances the work at least one tooth for each cutting stroke and cutter shaft rotation. An electric motor mounted in the base 10 drives a belt 11 and a shaft 12 extending transversely through the apparatus. Belt 11 is shrouded by a cover 14 at one side of the apparatus. Drive shaft 12 supports either a segmented worm 15 for intermittent work drive or a continuous worm 16 for continuous work drive, connecting the shaft through a worm wheel 20 with the substantially vertical work drive shaft 21. The cutter drive means 22 is driven from the end of shaft 12 remote from belt 11.

Work drive shaft 21 is adjustably connected to a main drive gear 26 which in turn meshes with an idler gear 27 mounted in coaxial driving relationship with pilot gear 28. Pilot gear 28 in turn meshes with a work gear 30 placed over an arbor 31 and against a locating surface 32.

In order to adjust the rotational position of the work relative to the cutter for optimum timing the adjustment of Figures 2 and 3 is provided. Nut 35 at the upper end of shaft 21 is released to free a collet type clamp 36 slidably keyed to shaft 21. Through adjustment of set screws 39 and 40 carried by clamp 36 and engaging pin 41 in the main drive gear 26 the rotational position of gear 26 about shaft 21 can be adjusted during set-up. By tightening nut 35, clamp 36 is wedged into gear 26 and against shaft 21 and the assembly is firmly maintained against slippage.

Segmented worm 15 has a helical portion 42 and a circular portion 43 to provide an advance during cutter retraction and to maintain the work gear stationary during the cutting portion of the cutter movement. Continuous worm 16 gives a continuous work rotation and the cutter movement is so timed and the cutter itself so developed as to provide the proper chamfer while both the work gear and the cutter are in movement. Wherever possible in machine drives it is advantageous both because of the wear life of the machine components and the rate of machine operation, to have continuous, smooth movements in the same direction. Sharp reversals or variations in movement make it difficult to operate machines at high rates of speed and result in rapid wear of moving parts. Because of this the continuous drive of worm 16 has advantages whenever it can be employed and is particularly advantageous when used in conjunction with a continuously rotating tool movement to be later described.

In the cutter drive of Figures 7 and 10 cutter 45 is mounted in a holder 46 at the outer end of cutter shaft 49. Shaft 49 is mounted eccentrically in a sleeve 50 carried in the apparatus. The drive between shaft 12 and cutter shaft 49 is shown most particularly in Figure 8. Gear 52 on shaft 12 meshes with an idler gear 54 which in turn meshes with a gear 55 at the inner end of cutter shaft 49. Idler gear 54 is supported by cooperating radial arms 57 and 58 extending respectively from shafts 49 and 12. Thus the train of drive gears in cutter drive 22 are maintained in continuous mesh during oscillations of the eccentric sleeve 50.

At the inner end of sleeve 50 clamp plate 60 is fixed for purposes later described. A preferred drive for oscillating sleeve 50 is by means of a cam follower 61 adjustably fixed at the same end of sleeve 50 by means of screw and slot arrangements one of which is indicated at 65 in Figure 10. Follower 61 carries roller 67 urged toward engagement with cam 70 by adjustable spring assembly 71. As shaft 12 rotates, sleeve 50 is oscillated.

The movement of cutter 45 resulting from the superimposed rotation of shaft 49 and oscillation of sleeve 50 provides a unique and advantageous movement wherein a cutter is basically rotating as its center is cyclically shifted during each rotation to modify the normal circular movement as desired. For example, referring to Figure 10, in chamfering the teeth 72 of a work gear having a surface 75 which would normally interfere with the circular cutter path indicated at 76, by rocking sleeve 50 the cutter path can be modified as seen at 77 to chamfer the desired end faces of teeth 72 while retracting to avoid the interfering adjacent surface 75. With such a cutter movement, shocks resulting from sharp reversal are avoided and a more rapid cutter movement is possible with a concurrent benefit of a longer service life for the apparatus. Either the intermittent drive of segmented worm 15 or the continuous work rotation provided by continuous worm 16 can be utilized with the cutter movement of Figures 7 and 10. In the majority of instances a continuous work gear rotation will be provided with a suitable cutter development making possible an extremely high rate of chamfering with little wear. A continuous worm such as that seen in Figure 5 is more economical to manufacture and the resulting drive is continuous and free of shock.

In the normal usage an adjustable timer is provided in the circuit of the apparatus which is set to time out after a predetermined period necessary for at least a full rotation of the work gear 30 and the complete chamfering thereof. A cam 80 on the drive shaft 12 engages and reciprocates the piston 82 of a lubrication pump and also periodically reciprocates rod 84 to actuate a switch unit 85. The circuit is conditioned for stopping by the adjustable timer and cam 80 is so positioned on shaft 12 as to actuate switch 85 at the proper time to momentarily reverse the drive motor, stopping the machine in a known manner and with the cutter clear of the work.

Figure 9 illustrates the drive when a circular path to the rotating cutter 45 is utilized. Sleeve 50 is held against oscillation as by clamp plate 60 firmly fixed by means of a screw and nut attachment 86 to a boss 87 on the apparatus housing. Cam 70 can be removed from shaft 12 or the follower locked in a position clear of the cam. Clamp 86 can be loosened and plate 60 adjusted during set-up to position the path of tool 45 relative to the work gear. This adjustment can be used, for example, to vary the cutting depth. Clamp plate 60 is calibrated and an indicating line is provided on boss 87 as an aid in adjusting the apparatus during set-up. A work gear is illustrated in Figure 9 and a circular movement of the cutter 45 is diagrammatically indicated in relation thereto. Thus it is seen by restraining of sleeve 50 against movement the apparatus is quickly adjusted to provide a circular cutter path with the cutter making one cutting movement between teeth for each index movement of the work gear whether continuous or intermittent.

Figures 11 to 13 illustrate the invention when a non-rotating cutter path is obtained. In this modification shaft 49 includes an eccentric portion 90 at its outer end supporting a holder 91 for cutter 92. A web 94 extends from sleeve 50 to rotatably support the outer end 95 of the eccentric portion 90. Tool holder 91 includes an arm 96 slidable in a guide 97 rotatably supported at 98 from the apparatus base. Thus holder 91 is carried for rotation relative to and for radial movement toward and from the center of support 98. A plate 100 for guide 97 is adjustably clamped in on a boss 101 by means of screw slot arrangement such as indicated in 102 and calibrations can be provided to aid in adjustment.

Shaft 49 is rotated through the gear drive shown in Figure 8. Sleeve 50 is actuated by a follower 105 adjustably attached as at 106 to the inner end of the sleeve and carrying a roller 107 spring urged against cam 110 driven from drive shaft 12. Follower 105 and clamp plate 111 are fixed to sleeve 50 in a manner similar to that for plate 60 and follower 61 in the modification of Figure 7. Rotation of shaft 49 would normally give a substantially elliptical non-rotating path to cutter 92 with the cutter continuously directed toward the part. Sleeve 50 through rotation of cam 110 modifies this path as desired for particular chamfering operations. A typical cutter path which can be obtained is indicated at 114 in Figure 13. If it is desired to have a simple substantially elliptical cutter path clamp plate 111 is locked in position, fixing sleeve 50 against rocking. Adjustments of plate 111 will vary the cutter path relative to the work as previously described. By adjusting follower 105 on sleeve 50, adjusting plate 100 on boss 101, varying the eccentric 90 and the configuration of cam 110, various cutter paths for particular operations can be easily obtained. In this application the intermittent drive of segmented worm 15 is usually employed because the cutter in most cases retracts along a path passing between the gear teeth.

Figure 14 illustrates a drive which can be used for positively rocking sleeve 50 through a simple back and forth movement. Plate 121 fixed to sleeve 50 is pivotally connected through an adjustment 122 to arm 124. Eccentric 125 on shaft 12 is rotatable within arm 124 to rock sleeve 50 back and forth. A possible cutter path with this sleeve drive is indicated at 126.

Thus it is seen that an apparatus for forming toothed elements such as gears and the like has been provided which has universal features and unique cutter movements for rapid and accurate chamfering through a long service life.

While the forms of apparatus herein described constitute preferred embodiments of the invention, it is to be understood that the invention is not limited to precise forms herein disclosed, and that changes may be made therein without departing from the scope of the invention which is defined in the appended claims.

What is claimed is:

1. An apparatus for chamfering toothed parts, comprising a base, work holding and driving means on said base, a cutter holder, a sleeve rotatably carried in the base, a cutter shaft rotatably mounted eccentrically in said sleeve and supporting said holder, power means including a drive shaft in said base operatively connected to said work driving means first actuating means connected between said drive shaft and said cutter shaft for continuous, full rotation of said cutter shaft in timed relationship to work drive movement, second actuating means operated by said drive shaft and connected to said sleeve for repeated cyclic back and forth oscillation of said sleeve, restraining means cooperating between said base and said sleeve for restraining said sleeve against oscillation for a first cutter path, and means operative to release said restraining means to render said second actuating means operative to obtain a second cutter path.

2. The apparatus of claim 1 wherein said second actuating means includes a cam on said drive shaft and a follower in engagement therewith and adjustably fixed to said sleeve.

3. The apparatus of claim 1 wherein said restraining means comprises an arm fixed to said sleeve, said release means including clamp means on said base at the outer end of the arm for adjustably fixing the arm in position.

4. An apparatus for forming toothed parts, comprising a base, work holding and driving means on said base, a cutter holder, a sleeve carried in said base, a cutter shaft rotatably mounted eccentrically in said sleeve and directly supporting said holder, a cam follower fixed to said sleeve, a driven shaft in said base in driving connection with said work driving means for carrying a cam in association with said follower for oscillatory sleeve movements, drive means connected between said driven shaft and said cutter shaft for continuous, full rotation of said cutter shaft within said sleeve, whereby a first cutter path is obtained through superimposed rotation of said cutter shaft and oscillation of said sleeve, and releasable clamp means between said base and said sleeve for restraining said sleeve against oscillation to obtain a second path of cutter movement.

5. An apparatus for forming toothed parts comprising a base, work holding and driving means on said base, a cutter holder, a rotatable shaft directly supporting said cutter holder, support means carrying said shaft in said base for bodily movement transverse the shaft axis during rotation, drive means operatively connected to said shaft and said support means for simultaneously continuously and fully rotating said shaft while automatically shifting the center of shaft rotation back and forth through a movement repeated for each shaft rotation, said drive means including means connected to said work driving means to advance the work at least one tooth for each cutter shaft rotation.

6. An apparatus for forming toothed parts comprising a base, work holding and driving means on said base, a cutter holder, a sleeve carried for rocking movement in said base, a cutter shaft rotatably mounted eccentrically in said sleeve and supporting said holder, power means, first drive means in said base operatively connected from said power means to said shaft for continuously and fully rotating said cutter shaft within said sleeve, second drive means connected between said power means and said sleeve for rocking oscillation of said sleeve in timed relationship to cutter shaft rotation, and a connection between said power means and said work driving means to move the work at least one tooth for each cutter shaft rotation.

7. An apparatus for forming toothed parts comprising a base, work holding and driving means on said base, a cutter holder, a sleeve carried in said base, a cutter shaft rotatably mounted eccentrically in said sleeve and supporting said holder, a cam follower operatively connected to said sleeve, a driven shaft in said base in driving connection with said work driving means and having a cam thereon in association with said cam follower for oscillating said sleeve, and drive means between said driven shaft and said cutter shaft for continuous full rotation of the cutter shaft within said sleeve in timed relation to oscillation of said sleeve, whereby the path of cutter movement is controlled by the superimposed sleeve oscillation and cutter shaft rotation.

8. An apparatus for forming toothed parts, comprising a base, work holding and driving means on said base, a cutter holder, a sleeve carried in said base, a cutter shaft mounted eccentrically in said sleeve and supporting said holder, a cam follower fixed to said sleeve, a driven shaft in said base in driving connection with said work driving means and having a cam thereon in association with said cam follower, whereby oscillations of said sleeve are obtained, and drive means between said driven shaft and said cutter shaft, including a gear fixed on each of the shafts, an idler gear in mesh with both said gears, cooperating supports extending from the shaft axes and connected to the idler gear whereby the gears are maintained in mesh during sleeve oscillations for rotation of the cutter shaft within the sleeve and a cutter movement is obtained as determined by the superimposed sleeve oscillations and cutter shaft rotations.

9. An apparatus for forming toothed parts comprising a base, work holding and driving means on said base, a cutter holder, a rotatable shaft including first and second relatively eccentric portions, said holder being carried on the first of said shaft portions, support means in said base rotatably carrying the second portion of said shaft for bodily movement transverse the shaft axis, power means connected to said work driving means, first drive means operatively connecting said power means to said shaft for continuous full rotation thereof during operation, second drive means operatively connecting said power means to said support means for simultaneously automatically shifting the center of shaft rotation back and forth in timed relation to shaft rotation, said holder including means allowing rocking movement of the holder about a center fixed relative to the base and movement of the holder toward and from the center.

10. An apparatus for forming toothed parts, comprising a base, work holding and driving means on said base, a sleeve carried in said base, a cutter holder, a cutter shaft mounted eccentrically in said sleeve and having an eccentric portion supporting said holder, a cam follower fixed to said sleeve, a driven shaft in said base in driving connection with said work driving means and having a cam thereon in association with said follower for oscillation of said sleeve, drive means connected between said driven shaft and said cutter shaft for rotation thereof within said sleeve during oscillation of the sleeve by the cam drive, said tool holder including means allowing rocking movement of the holder about a center fixed relative to the base and movement of the holder toward and from the center whereby the holder has a compound movement in response to the superimposed sleeve oscillation and eccentric rotation.

11. An apparatus for forming toothed parts, comprising a base, work holding and driving means on said base, a sleeve carried in said base, a cutter holder, a cutter shaft mounted eccentrically in said sleeve and having an eccentric outer portion supporting said holder, a cam follower fixed to said sleeve, a driven shaft in said base in driving connection with said work driving means and having a cam thereon in association with said follower for oscillation of said sleeve, drive means connected between said driven shaft and said cutter shaft for rotation thereof within said sleeve during oscillation of the sleeve by the cam drive, said holder including a guide pivotally mounted on said base, and an arm slidably carried in said guide, whereby the holder has a compound movement resulting with a superimposed sleeve oscillation and the eccentric rotation.

12. An apparatus for forming toothed parts such as gears or the like, comprising a base, work holding and driving means on said base, a sleeve carried in said base, a cutter holder, a cutter shaft mounted eccentrically in said sleeve and having an eccentric outer portion supporting said holder, a cam follower fixed to said sleeve, a driven shaft in said base in driving connection with said work driving means and having a cam thereon in association with said follower for oscillation of said sleeve, drive means connected between said driven shaft and said cutter shaft for rotation thereof within said sleeve during oscillation of the sleeve by the cam drive, including a gear on each of said shafts and an idler gear maintained in continuous mesh therewith during oscillations of said sleeve, said holder including means allowing rocking movement of the holder about a center fixed relative to the base and toward and from the center whereby the holder has a compound movement resulting from the superimposed sleeve oscillation and shaft rotation.

References Cited in the file of this patent

UNITED STATES PATENTS

| | | |
|---|---|---|
| 1,511,213 | Arnold | Oct. 14, 1924 |
| 1,960,536 | Haas | May 29, 1934 |
| 1,975,151 | Hill | Oct. 2, 1934 |
| 2,116,181 | Bauer | May 3, 1938 |
| 2,135,819 | Klix | Nov. 8, 1938 |
| 2,372,815 | Denton | Apr. 3, 1945 |
| 2,433,201 | Cross | Dec. 23, 1947 |
| 2,668,480 | Christman | Feb. 9, 1954 |